Dec. 6, 1966   E. L. SANKEY   3,290,547
PRESSURE RELIEF AND FAILURE INDICATING MEANS FOR ARRESTER
Filed Oct. 19, 1964

INVENTOR
EDWARD L. SANKEY

BY Lee H Kaiser

ATTORNEY

United States Patent Office 3,290,547
Patented Dec. 6, 1966

3,290,547
PRESSURE RELIEF AND FAILURE INDICATING MEANS FOR ARRESTER
Edward L. Sankey, Oak Creek, Wis., assignor to McGraw-Edison Company, Milwaukee, Wis., a corporation of Delaware
Filed Oct. 19, 1964, Ser. No. 404,689
2 Claims. (Cl. 315—36)

This invention relates to lightning arresters and, in particular, to venting and indicating means for lightning arresters.

A lightning arrester comprises a gap structure connected in series with a current limiting element capable of varying its resistance inversely with discharge current so that the voltage across the arrester is held to a magnitude which will not injure apparatus protected by the arrester. The gap structure interrupts the sixty cycle follow current which the current limiting element permits to flow through the arrester. The current limiting element and gap structure are conventionally mounted within a tubular porcelain housing which is sealed against entry of moisture. An arrester may be damaged internally when subjected to current and/or voltage beyond its rating, and such damage may cause internal arcing within the arrester housing which can generate sufficient gas under high pressure to burst the housing. When fault current of high magnitude damages the arrester, usually blackening and thermal fracture of the arrester housing occurs which permits a utility to readily locate the fault on their system. However, when the fault current is of relatively low magnitude, no visible damage or discoloring occurs to the arrester housing and it is difficult for the utility to locate the fault.

It is an object of the invention to provide a lightning arrester having improved means to vent the arrester housing before internal pressure reaches dangerous magnitudes and which provides positive indication of the damaged arrester so that a utility can easily locate the fault.

Figure 1:
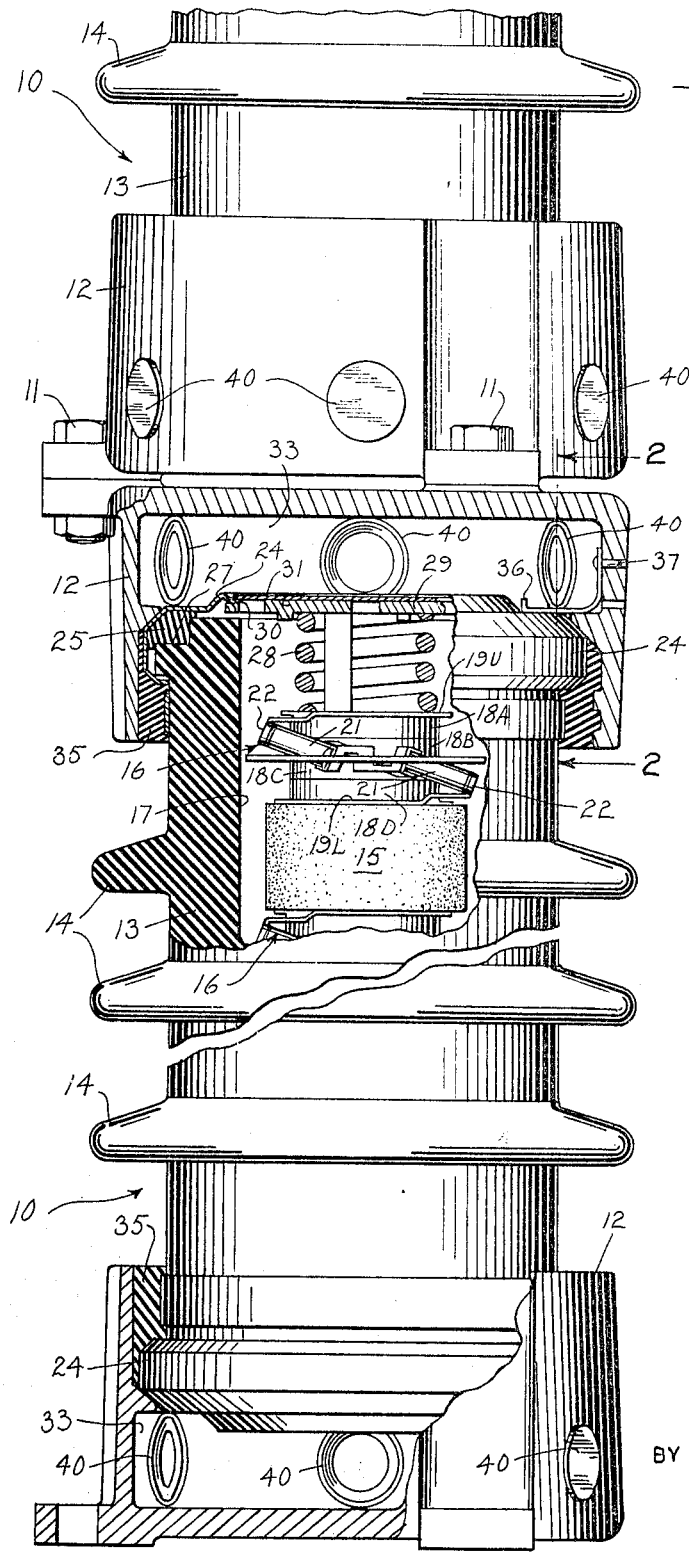
Figure 2:
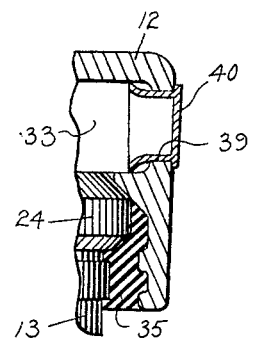

This and other objects and advantages of the invention will be more readily apparent from the following detailed description when taken in conjunction with the accompanying drawing wherein:

FIG. 1 is an elevation view, partly in section, of stacked lightning arresters embodying the invention; and
FIG. 2 is a view taken on line 2—2 of FIG. 1.

Referring to the drawing, two intermediate class lightning arresters 10 are joined in a stack by bolts 11 extending through aligned clearance holes in the end castings 12 of the arresters. Each arrester 10 includes a tubular porcelain housing 13 having a plurality of deep skirts 14 which provide long creepage distance over the external surface of the arrester and enclosing in conventional manner a plurality of current limiting valve block resistor elements 15 stacked alternately in a column with a plurality of spark gap units 16 in electrical series relation within the axial bore 17 in the porcelain housing 13. The nonlinear valve block resistors 15 are cylindrical in configuration and are preferably composed of granulated valve material such as silicon carbide and an essentially nonconductive binding material. The spark gap units 16 are disclosed and claimed in the copending application of Fred J. Schultz, Serial No. 342,872, filed February 4, 1964, now Patent No. 3,242,376, having the same assignee as the present invention, and to which reference is made for details of construction. Each spark gap unit 16 includes four hollow discs 18A, 18B, 18C and 18D arranged to define a pair of chambers (not shown) enclosing spaced electrodes defining spark gaps (not shown) connected in series between upper and lower metallic end plates 19U and 19L. Nonlinear grading resistors 21 are connected to metallic terminals 22 on the end plates 19U and 19L and shunt the spark gaps (not shown) to assure uniform distribution of sixty cycle voltage across the entire stack of valve blocks 15 and spark gap units 16.

The open ends of tubular porcelain housing 14 may be permanently sealed by metallic end caps 24 preferably of stainless steel which are spun thereon and hold annular gaskets 25 of suitable resilient material such as synthetic rubber against annular seats 27 provided in the outer periphery adjacent the ends of porcelain housing 14. The axial column of alternate valve block resistors 15 and spark gap units 16 is maintained in electrical conductive relation between upper and lower metallic end caps 24 by a heavy steel compression spring 28 which at its upper end engages an apertured metallic support member 29 disposed against the upper end cap 24 and at its lower end engages the end plate 19U of the uppermost spark gap unit 16 and maintains high pressure contact between the spark gap units 16 and valve block elements 15.

Stainless steel end caps 24 have central venting apertures 30 closed by rupturable, lead, pressure relief diaphragm 31 secured thereto in gastight manner by suitable means such as solder. Apertured metallic support member 29 is of larger diameter than venting aperture 30 and is disposed between upper end cap 24 and compression spring 28 so that the force of spring 28 is exerted against upper end cap 24 rather than against the rupturable lead diaphragm 31. When the lightning arrester is damaged electrically and fails, an arc may flash over the valve blocks 15 and the spark gap units 16 and generate hot gases and vapors which build up gas pressure to a relatively high value within the arrester housing 14. The lead diaphragm 31 bulges outwardly during initial stages of gas pressure buildup, but when the internal pressure approaches a predetermined dangerous magnitude which could burst the housing 14, the lead diaphragm 31 ruptures and vents the housing 14 to the venting chamber 33 defined by the end casting 12.

End castings 12 are generally of cup-shape and preferably of aluminum alloy which contributes to light weight and provides a sturdy base for stacking and mounting of the arrester. Cup-shaped end castings 12 surround the ends of porcelain housing 14 including end caps 24 and are secured thereto in gastight manner by suitable means such as cement 35. The end castings 12 define venting chambers 33 sealed from the interior of porcelain housing 14 by the lead diaphragm 31. Spring members 36 secured to end casting 12 by suitable means such as rivets 37 electrically connect the end castings 12 to the metallic end caps 24 on the porcelain housing 14.

Cup-shaped end castings 12 have a plurality of radially extending venting apertures 39 in the sidewall thereof which register with the venting chambers 33 and are releasably closed by vent plugs 40 preferably of plastic which normally keep the venting chambers 33 within the end castings free from external contamination. After a lead diaphragm 31 ruptures due to excessive pressure within the porcelain housing 14, the venting chamber 33 within the end casting is exposed to the high pressure which then blows the plugs 40 out of the venting apertures 39, thereby venting the arrester to the atmosphere before internal pressure reaches dangerous magnitudes and assuring safety of linemen when replacing damaged arresters. The ejected vent plugs 40 provide positive visual indication of which arrester is damaged even though the magnitude of fault current may be so low that no discoloring or fracture of the arrester housing occurs.

While only a single embodiment of the invention has been illustrated and described, many modifications and variations thereof will be readily apparent to those skilled in the art, and consequently it is intended in the appended claims to cover all such modifications and variations which fall within the true spirit and scope of the invention.

I claim:

1. In a lightning arrester having a tubular insulating housing enclosing spark gap and valve block resistor elements, a rupturable pressure sensitive diaphragm sealing one end of said housing, a cup-shaped metallic end member surrounding said one end of said housing and said diaphragm and defining a venting chamber sealed from the interior of said housing by said diaphragm and also having venting apertures in the sidewall thereof communicating with said venting chamber, and plugs releasably closing said venting apertures and being adapted to be ejected therefrom in response to a predetermined pressure within said venting chamber incident to rupture of said diaphragm caused by failure of said arrester and buildup of pressure within said housing, whereby said diaphragm and plugs vent said arrester to prevent rupture of said housing and provide a positive visual indication of arrester failure.

2. In a lightning arrester, a tubular porcelain housing, a column of spark gap elements and valve block resistor elements within said housing, a metallic end cap sealing one end of said housing and having a central aperture therein, a thin diaphragm sealing said aperture and adapted to be ruptured by excessive pressure of gases generated as a result of arcing within said housing, an apertured metallic support member within said housing disposed against said end cap, a spring within said housing compressed between said support member and said column of elements and maintaining said resistor and valve block elements in pressure contact with one another, a cup-shaped metallic end casting surrounding said one end of said housing including said end cap and said diaphragm and defining a venting chamber sealed from the interior of said housing by said diaphragm, means for securing said end casting in gastight manner to said one end of said porcelain housing, said end casting having a plurality of radially extending venting openings in the sidewall thereof, and plugs releasably closing said venting openings and being adapted to be ejected therefrom in response to a predetermined pressure within said venting chamber incident to rupture of said diaphragm, whereby said diaphragm and plugs vent said arrester to prevent rupture of said housing and also provide positive visual indication of arrester failure.

No references cited.

DAVID J. GALVIN, *Primary Examiner.*